United States Patent
Barth

(10) Patent No.: US 7,717,328 B1
(45) Date of Patent: May 18, 2010

(54) AUTO CHECK REORDER

(75) Inventor: Ryan Barth, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 913 days.

(21) Appl. No.: 11/321,433

(22) Filed: Dec. 29, 2005

(51) Int. Cl.
  *G07F 19/00* (2006.01)
(52) U.S. Cl. .................................. 235/379; 235/375
(58) Field of Classification Search ................ 235/375, 235/383, 384, 385, 382, 380, 379
See application file for complete search history.

(56) References Cited

U.S. PATENT DOCUMENTS

| | | | |
|---|---|---|---|
| 5,012,073 A * | 4/1991 | Hewitt et al. ................ 235/375 |
| 5,708,782 A * | 1/1998 | Larson et al. ................ 705/14 |
| 5,825,003 A | 10/1998 | Jennings et al. |
| 6,754,640 B2 | 6/2004 | Bozeman |
| 7,047,222 B1 | 5/2006 | Bush |
| 7,058,612 B2 | 6/2006 | Park et al. |
| 7,185,805 B1 | 3/2007 | McShirley |
| 7,283,981 B2 | 10/2007 | Solem |
| 7,401,025 B1 | 7/2008 | Lokitz |
| 2004/0138975 A1 | 7/2004 | Engel et al. |
| 2005/0182725 A1 | 8/2005 | Modica |

OTHER PUBLICATIONS

"Online check reordering is fast and easy in account link," *PNC Bank*, http://www.pncbank.com/personal_finance/online_banking_center/account_link by_web, downloaded from the Internet on Nov. 21, 2005, 1 page.

* cited by examiner

*Primary Examiner*—Karl D. Frech
(74) *Attorney, Agent, or Firm*—Townsend and Townsend and Crew LLP

(57) ABSTRACT

The described embodiments contemplate a system, method and computer-readable medium with computer-executable instructions for providing checks to an account owner by comparing a quantity of cleared checks to a quantity of issued checks. The novel method includes receiving a request to register for an automated check reorder service, determining a first quantity of issued checks, determining a second quantity of cleared checks, comparing the second quantity of cleared checks to the first quantity of issued checks, and sending a third quantity of new checks to the account owner. The novel method also may include receiving a request for material to be sent to the account owner, determining the account owner's last known address, notifying the account owner at the account owner's last known address, and sending the material to the account owner.

14 Claims, 5 Drawing Sheets

AUTO CHECK REORDER

CROSS REFERENCE TO RELATED APPLICATIONS

This application is related by subject matter to the inventions disclosed in the following commonly assigned application, the entirety of which are hereby incorporated by reference herein: U.S. patent application Ser. No. 11/322,184, and U.S. patent application Ser. No. 11/321,561, all filed on Dec. 29, 2005 and all entitled "Auto Check Reorder."

BACKGROUND

Checks typically provide a safe and convenient method for an individual to purchase goods and/or services. To use a check, the individual usually must open a checking account, or other similar account, at a financial institution and deposit funds, which are then available for later withdrawal. To pay for goods and/or services with a check, the payor (i.e., the account owner) usually designates a payee (i.e., the merchant or seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

Checks have certain advantages over other forms of payment, such as cash. For example, while often considered the most liquid type of asset, cash may also be the least secure. Unlike a check, cash is usually freely transferable and does not have to be endorsed. Thus, the owner and possessor of cash is most often the same individual. Because cash is freely transferable, cash that is lost or stolen typically cannot be recovered. Therefore, the risks associated with cash transactions are often unacceptable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantageous as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While checks may provide an account owner a convenient and secure form of payment, obtaining new checks may also put certain burdens on the account owner, such as the time and effort required to monitor check usage. For example, an account owner usually obtains a finite quantity of checks at one time. Thus, the account owner is typically limited to writing a certain number of checks based on the quantity of unused checks on hand. As checks are written and cashed, fewer checks are available and the account owner may be required to reorder more when the supply of unused checks is insufficient. However, the account owner may not realize how many unused checks are available. This frequently occurs because unused checks are often stored out of sight, maybe in a desk drawer or in a file cabinet. Furthermore, an account may have multiple owners, each writing checks from the same account. Thus, each account owner may not know how many checks have been written and/or how many unused checks remain. If an insufficient number of unused checks are available, the account owner typically must manually reorder new checks and wait for them to arrive and/or resort to another form of payment. This can be problematic when paying bills, for example, because bills are often payable by mail and due on a specific date.

In addition to monitoring check usage, an account owner often must manually go through the process of reordering checks, which can be tedious and time consuming. Typically, the reordering process involves calling a customer service representative, mailing in a check reorder form and/or sending a request via a website. Therefore, there is a need for an automated check reorder process that provides new checks to an account owner when new checks are needed.

SUMMARY

The described embodiments contemplate a system, method and computer-readable medium with computer-executable instructions for providing checks to an account owner by comparing a quantity of cleared checks to a quantity of issued checks. The novel method includes receiving a request to register for an automated check reorder service, determining a first quantity of issued checks, determining a second quantity of cleared checks, comparing the second quantity of cleared checks to the first quantity of issued checks, and sending a third quantity of new checks to the account owner. The novel method also may include receiving a request for material to be sent to the account owner, determining the account owner's last known address, notifying the account owner at the account owner's last known address, and sending the material to the account owner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1A:
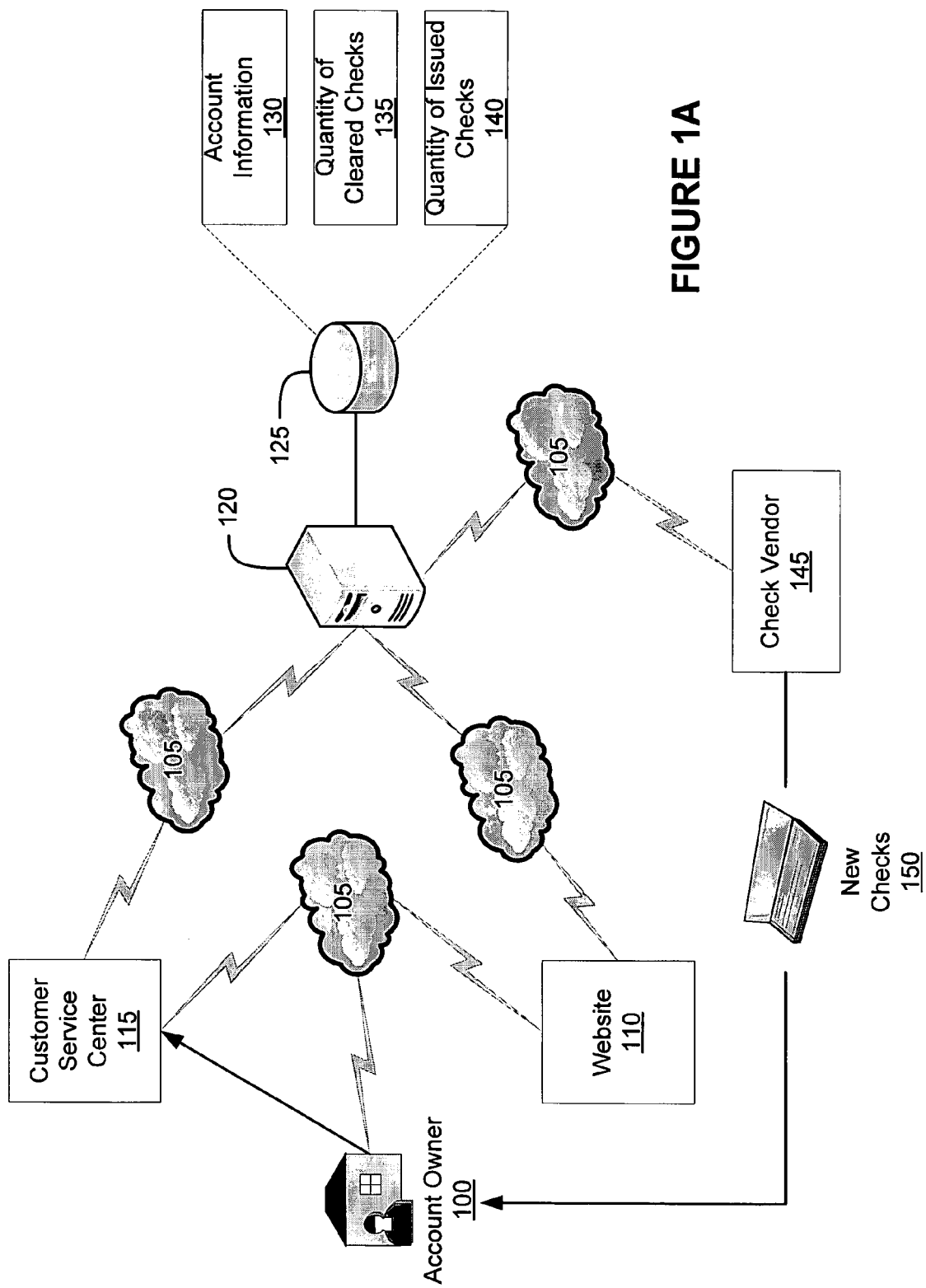
FIG. 1A is a diagram illustrating an example system in which aspects of the invention may be incorporated.

FIG. 1A illustrates an example system in which the present invention may be employed. Of course, actual network and database environments may be arranged in a variety of configurations; however, the example environment shown here provides a framework for understanding the type of environment in which an embodiment may operate.

The example system may include account owner 100, website 110, customer service center 115, server computer 120, database 125, and/or check vendor 145. Account owner 100 may communicate with customer service center 115 by way of communication network 105, which may include an intranet, the Internet, a local area network (LAN), a wide area network (WAN), a public switched telephone network (PSTN), a cellular network, a Voice over Internet Protocol (VoIP) Network, and the like. Account owner 100 may also communicate with customer service center 115 by way of a common carrier, such as the United States Post Office, FedEx, United Parcel Service and the like. Customer service center 115 typically includes one or more operators (not shown) who are capable of assisting account owner 100. For example, the operators may answer questions, resolve problems and/or provide any type of service desired by account owner 100. The operators are usually reachable by phone, facsimile, mail and/or email. Account owner 100 may communicate with website 110 by way of communication network 105. In addition, website 110 and customer service center 115 may be connected to server computer 120 by way of communication network 105.

Server computer 120 may be in communication with check vendor 145 by way of communication network 105. Additionally, by way of example, and not limitation, server 120 may provide management of database 125 by way of database server system software. As such, server 120 may act as a storehouse of data from a variety of data sources and provides that data to a variety of data consumers. Database 125 may store various types of account related information, such as account information 130, quantity of cleared checks 135 and quantity of issued checks 140. By way of example, and not limitation, account information 130 may include account owner's 100 name, address, telephone, email address, account number, account balance, and the like. Quantity of issued checks 140 may represent the quantity of checks that were sent to the account owner the last time checks were ordered. Quantity of cleared checks 135 may represent the quantity of checks that have cleared the account (e.g., checks that have been cashed) since checks were last issued to account owner 100.

Server computer 120 may include executable software instructions for performing automated check reorder processing. For example, server computer 120 may contain software modules for determining the quantity of checks last issued to account owner 100, determining the quantity of checks that cleared the account, comparing the quantity of cleared checks to the quantity of issued checks, and generating a request to send new checks to account owner 100. In addition, server computer 120 may contain executable software instructions for ensuring that new checks are sent to a proper address. For example, server computer 120 may contain software modules for receiving a request for new checks, retrieving the last known address, generating a request to notify account owner 100 at the last known address and generating a request to send the new checks to account owner 100. Server computer 120 may update the last known address, prior to sending the new checks, as necessary.

In one embodiment, account owner 100 may access website 110 to check an account balance, apply for a loan, and/or register for an automated check reorder service. Information may be passed to and from server computer 120. For example, account owner 100 may send the registration request to server computer 120 via website 110. Sever computer 120 may send a confirmation to website 110 notifying account owner 100 that the registration was successful. Once registration is complete, server computer 120 may process the request by accessing information stored in database 125. For example, server computer 120 may access account information 130 stored in database 125 and verify that account owner 100 has an account for withdrawing funds by way of a check or other similar type of negotiable instrument. Additionally, server computer 120 may compare quantity of cleared checks 135 with quantity of checks issued 140. If new checks are required, server computer 120 may generate and/or send a request to check vendor 145. The request may include the account owner's name, address, telephone number, type of checks, quantity of new checks and the like. Check vendor 145 may process the request by sending new checks 150 to account owner 100 via a common carrier.

In another embodiment, account owner 100 may contact customer service center 115 to register for the automated check reorder service. An operator (not shown) at contact customer service center 115 may enter the registration request into a computer system (not shown) that may be in communication with server computer 120. Once the registration request is received by server computer 120, the operator may confirm the registration with account owner 100. Server computer 120 may then process the request in the same manner outlined above.

It will be appreciated that the preceding examples are for purposes of illustration and explanation only, and that an embodiment is not limited to such examples. For example, server computer 120 is not limited to database 125 but may be connected to numerous databases, each containing various types of information. Furthermore, server computer 120 may generate and/or send a request for new checks to someone other than check vendor 145.

Figure 1B:
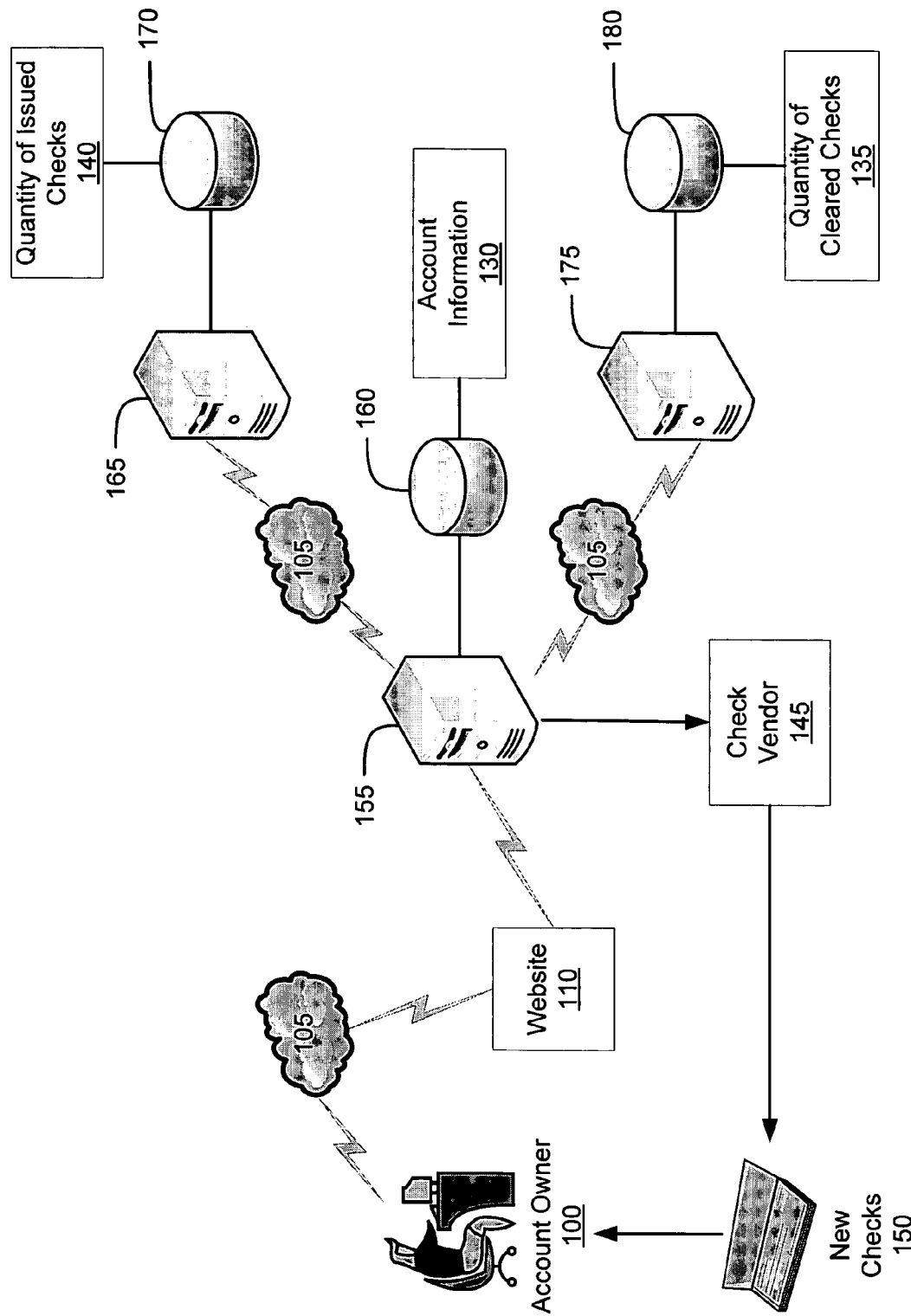
FIG. 1B is a diagram illustrating an alternative embodiment of an example system in which aspects of the invention may be incorporated.

FIG. 1B illustrates an alternative embodiment of an example system in which the present invention may be employed. As noted above, account owner 100 may communicate with website 110 by way of a communication network 105. Website 110 may be connected to server computer 155 by way of a communication network 105. Server computer 155 may also be connected to server computers 165 and 175 by way of communications network 105. Server computers 155, 165 and 175 may manage databases 160, 170 and 180, respectively. Databases 160, 170 and 180 may include various types of account related information. For example, database 160 may store account information 130 while databases 170 and 180 store values representing quantity of issued checks 140 and quantity of cleared checks 135, respectively.

In one embodiment, account owner 100 may register for the automated check reorder service by accessing website 105 via communication network 105. The registration request may be received and processed by server computer 155. Server computer 155 may then access account information 130 stored in database 160 and verify that account owner 100 has an account for withdrawing funds by way of a check or other similar negotiable instrument. Once the account has been verified, server computer 155 may send a request to server computer 165 for information indicative of quantity of issued checks 140. Server computer 155 may also send a request to server computer 175 for information indicative of quantity of cleared checks 135. Server computer 155 may then compare quantity of cleared checks 135 with quantity of checks issued 140. If new checks are required, server computer 150 may generate and/or send a request to check vendor 145. The request may include the account owner's name, address, telephone number, type of checks, quantity of new checks and the like. Check vendor 145 may process the request by sending new checks 150 to account owner 100 via a common carrier.

It should be appreciated that account information 130, quantity of issued checks 140 and quantity of cleared checks 135 may be stored in different server computers than what is depicted in FIG. 1B. For example, server computer 155 may store quantity of issued checks 140 and server computer 165 may store account information 130. Also, it should be appreciated that the number of server computers may vary depending upon the particular application and that server computers 155, 165 and 175 each may be capable of comparing quantity of cleared checks 135 to quantity of issued checks 140 and generating and/or sending a request to check vendor 145.

Figure 2A:
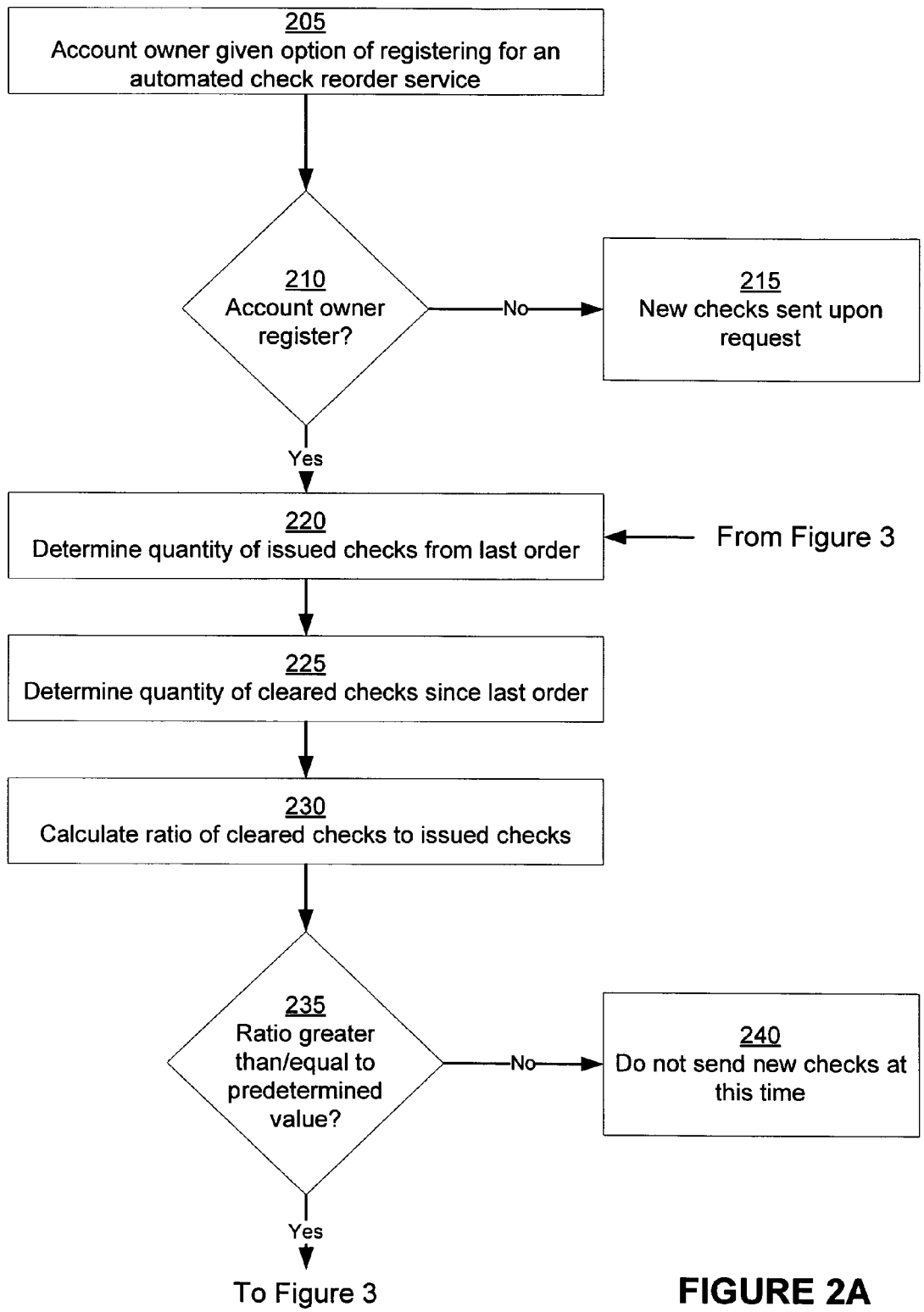
FIG. 2A is a flow diagram illustrating an example method of providing new checks to an account owner.

FIG. 2A is a flow diagram illustrating an example method of providing new checks to an account owner by calculating a ratio of a quantity of cleared checks to the quantity of issued checks and comparing the ratio to a predetermined value. As shown in FIG. 2A, at 205, an account owner is given the option of registering for the automated check reorder service. At 210, it is determined whether the account owner registered for the service. If the account owner did not register for the service, the process proceeds to 215. At 215, new checks may be sent to the account owner upon request. If it is determined at 210 that the account owner registered for the service, the process proceeds to 220. At 220, a quantity of issued checks from the last check order may be determined. At 225, a quantity of cleared checks since the last check order may be determined. At 230, a ratio of the quantity of cleared checks to the quantity of issued checks may be calculated. At 235, the ratio may be compared to a predetermined value. If the ratio is less than the predetermined value the process proceeds to 240. At 240, new checks are not sent to the account owner and 210 through 235 may be repeated. If the ratio is equal to or greater than the predetermined value the process proceeds to 305.

Figure 2B:
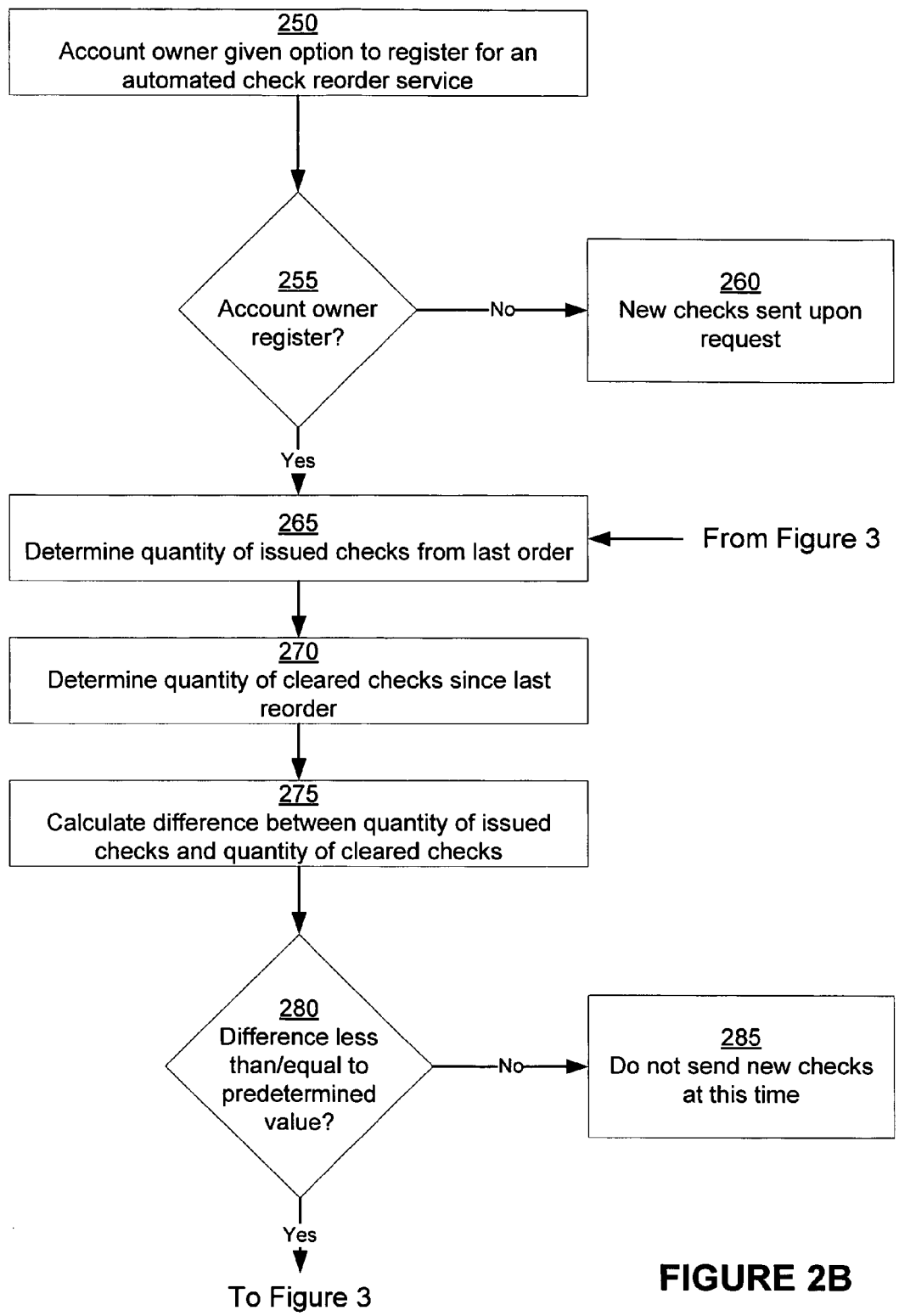
FIG. 2B is a flow diagram illustrating an alternative embodiment of an example method of providing new checks to an account owner.

FIG. 2B is a flow diagram illustrating an alternative embodiment of an example method of providing new checks to an account owner by calculating the difference between the quantity of issued checks and the quantity of cleared checks and comparing the difference to a predetermined value. At 250, an account owner is given the option of registering for the automated check reorder service. At 255, it may be determined whether the account owner registered for the service. If the account owner did not register, the process proceeds to 260. At 260, new checks may be sent to the account owner upon request. If it is determined at 255 that the account owner registered for the service, the process proceeds to 265. At 265, a quantity of issued checks from the last check order may be determined. At 270, a quantity of cleared checks since the last check order may be determined. At 275, the difference between the quantity of issued checks and the quantity of cleared checks may be calculated. At 280, the difference between the quantity of issued checks and the quantity of cleared checks may be compared to a predetermined value. If the difference is less than or equal to the predetermined value, then the process proceeds to 305. Otherwise, the process proceeds to 285. At 285, new checks are not sent to the account owner and 255 through 280 may be repeated.

Figure 3:
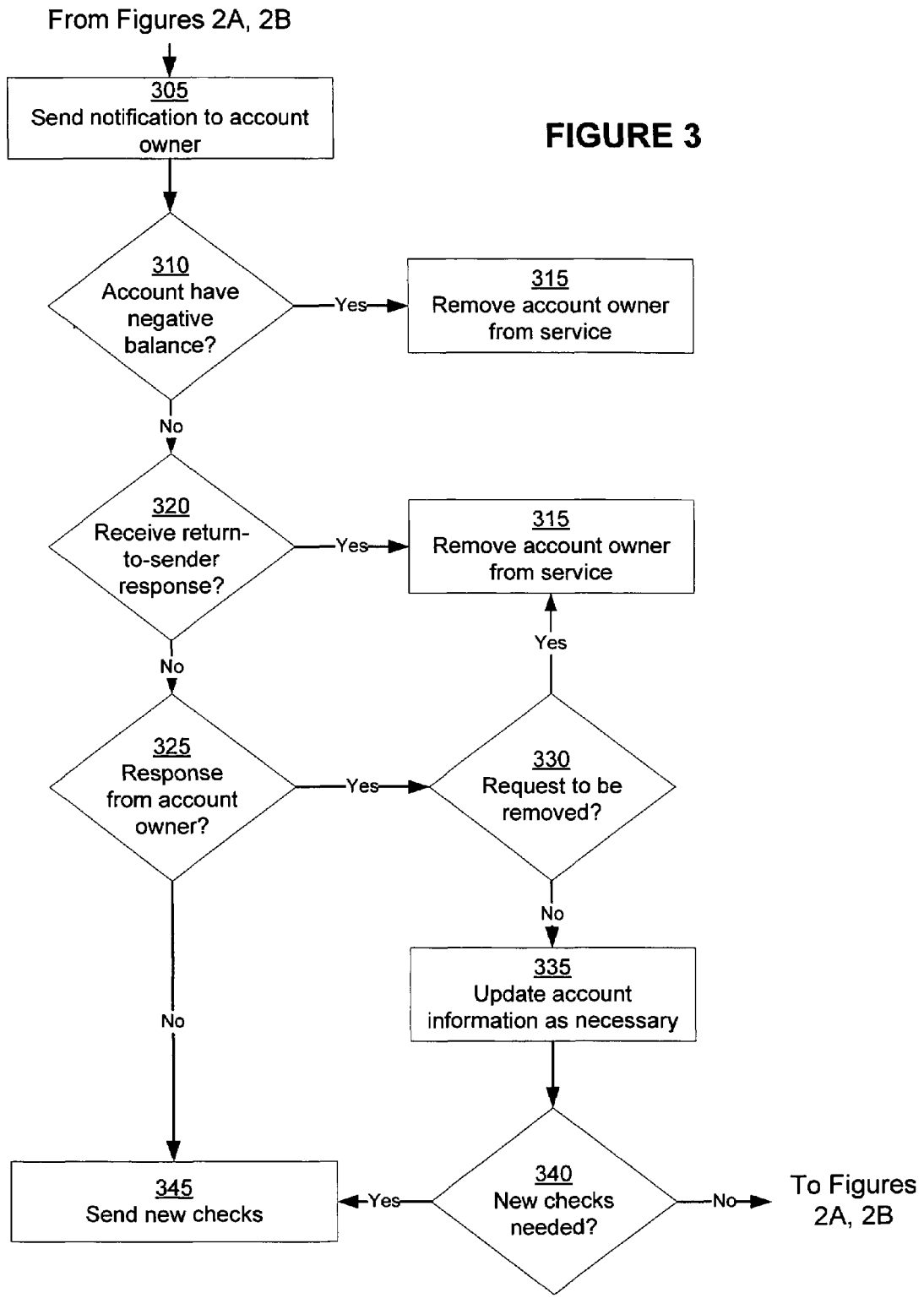
FIG. 3 is a flow diagram illustrating an alternative embodiment of an example method of providing new checks to an account owner.

FIG. 3 is a flow diagram illustrating an alternative embodiment of an example method of providing new checks to an account owner. At 305, a notification is sent to the account owner's last known address, which often corresponds to the last address provided by the account owner. The notification may include an announcement that that the account owner is running low on checks, that new checks will be mailed to the last known address and/or that new checks will be sent on a specific date. The notification may be provided in various formats, such by an automated voice message, manual voice message, mail, email, instant messaging and/or facsimile. It should be appreciated that the notification may be sent prior to sending various types of material to the account owner.

For example, a financial institution may wish to notify the account owner that a loan document, account statement, credit card, credit card offer, tax document, proceeds from a loan and/or proceeds from the sale of an asset or any other type of sensitive financial information will be sent to the account owner's last known address. By sending a notification prior to actually sending material to the account owner, the financial institution may reduce the likelihood of fraud and/or theft by ensuring that the material is delivered to the account owner's proper address, which typically corresponds to the account owner's current place of residence.

Returning to FIG. 3, at 310, it may be determined whether the account owner has a negative balance. If the account has a negative balance, the process proceeds to 315 where the account owner is removed from the automated check reorder service. Otherwise, the process proceeds to 320. At 320, it may be determined whether a return-to-sender response has been received. A return-to-sender response is typically received if the carrier responsible for delivering a letter, for example, is unable to perform the delivery. This may occur if the address on the letter is incorrect and/or if the intended recipient has changed residences. If a return-to-sender response has been received, the process proceeds to 315 where the account owner is removed from the automated check reorder service. Otherwise, the process proceeds to 325.

At 325, it may be determined whether a response has been received from the account owner. If a response has not been received from the account owner, the process proceeds to 345 and new checks are sent to the account owner. If a response has been received from the account owner, the process proceeds to 330. At 330, it may be determined whether the account owner has requested to be removed from the service. If the account owner has requested to be removed from the service, the process proceeds to 315 where the account owner is removed from the automated check reorder service. Otherwise, the process proceeds to 335. At 335, the account information may be updated as necessary. At 340, it is determined if the account owner wishes to receive the new checks and/or a different quantity of new checks. If the account owner is in need of the new checks, then the process proceeds to 345 where the new checks are sent to the account owner. Otherwise, the process proceeds to 220 in FIG. 2A or step 265 in FIG. 2B. It will appreciated that 305-340 may be performed to enhance the functionality of the automated check reorder service.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the present invention.

While the present invention has been described in connection with the embodiments of the various figures, it is to be understood that other similar embodiments may be used or modifications and additions may be made to the described embodiment for performing the same function of the present invention without deviating therefrom. For example, any method that uses a quantity of issued checks and a quantity of cleared checks as criteria for sending new checks to an account owner is consistent with the present invention. Therefore, the present invention should not be limited to any single embodiment, but rather should be construed in breadth and scope in accordance with the appended claims.

What is claimed:

1. A method for sending material to an account owner's proper address, comprising:
    receiving, at a host computer system, a request from the account owner for enrollment in an automated check reorder service;
    determining, at the host computer system, that the account owner is linked to a checking account;
    determining, at the host computer system, a number of checks previously issued to the account owner linked with the account;
    determining, at the host computer system, a number of cleared checks associated with the account;
    comparing, at the host computer system, the number of checks previously issued to the account owner to the number of cleared checks associated with the account;
    determining, at the host computer system, to supply the account owner with a number of new checks;
    determining, at the host computer system, the account owner's last known address;
    sending, a notification to the account owner, wherein the notification informs the account owner that new checks will be mailed to the account owner's last known address;
    waiting at least a predetermined amount of time; and
    in response to waiting at least the predetermined amount of time, notifying a check vendor to mail new checks to the account owner's last known address.

2. The method of claim 1, wherein sending the notification to the account owner comprises notifying the account owner using an electronic communication.

3. The method of claim 1, further comprising sending the material to the account owner unless at least one of the following are received:
    a return-to-sender response, or
    a request by the account owner not to send the material.

4. The method of claim 1, further comprising receiving a response to the notification from the account owner.

5. The method of claim 4, further comprising updating the last known address based on information received in the response to the notification.

6. The method of claim 1, wherein sending the notification to the account owner comprises notifying the account owner through a mailing to the account owner's last know address.

7. A system comprising a processor and a computer-readable storage medium having computer-executable instructions for sending new checks to an account owner's proper address, the instructions comprising instructions for:
    receiving a request from the account owner for enrollment in an automated check reorder service;
    determining that the account owner is linked to a checking account;
    determining the account owner's last known address;
    notifying the account owner that new checks will be mailed to the account owner's last known address;
    waiting at least a predetermined amount of time for a response from the account owner; and
    notifying a check vendor to send the material to the account owner in response to waiting at least the predetermined amount of time, wherein no response is received from the account owner during the predetermined amount of time.

8. The system of claim 7, wherein the computer-executable instructions further comprise instructions for notifying the account owner using email.

9. The system of claim 7, wherein the computer-executable instructions further comprise instructions for:
    sending the material to the account owner unless at least one of the following are received:
    a return-to-sender response or
    a request by the account owner not to send the material.

10. The system of claim 7, wherein the computer-executable instructions further comprise instructions for:
    receiving a response to the notification.

11. The system of claim 10, wherein the computer-executable instructions further comprise instructions for:
    updating the account owner's last known address based on information received in the response to the notification.

12. The system of claim 7, the system further comprising at least one subsystem to:
    send the material to the account owner in accordance with a check reorder received from the account owner, wherein the material comprises new checks.

13. A computer-readable medium comprising computer-readable instructions for providing checks to an account owner, the computer-readable instructions comprising instructions that:
- receive a request from the account owner for enrollment in an automated check reorder service;
- determine the account owner's last known address;
- notify the account owner electronically that new checks will be mailed to the account owner's last known address;
- wait at least a predetermined amount of time for a response from the account owner; and
- notify a check vendor to send new checks to the account owner at the account owner's last known address in response to waiting at least the predetermined amount of time and receiving no response from the account owner during at least the predetermined amount of time.

14. The computer-readable instructions of claim 13, further comprising instructions that:
- receive a response to the notification and
- update the account owner's last known address based on information received in the response to the notification.

* * * * *